United States Patent [19]
Kardashian

[11] 3,924,261
[45] Dec. 2, 1975

[54] DISPLACEMENT DETECTOR USING MAGNETOMETER SENSOR

[75] Inventor: Vahram S. Kardashian, Plymouth Village, Minn.

[73] Assignee: Honeywell Inc., Minneapolis, Minn.

[22] Filed: May 3, 1971

[21] Appl. No.: 139,335

[52] U.S. Cl. .................................. 340/17; 73/71.2
[51] Int. Cl.².... G01V 1/16; G01D 7/00; G01N 9/18
[58] Field of Search .......... 340/8, 17; 73/71.2, 71.4; 324/43

[56] References Cited
UNITED STATES PATENTS

| | | | |
|---|---|---|---|
| 1,974,422 | 9/1934 | Hayes | 340/17 |
| 2,390,328 | 12/1945 | Roberts | 340/17 |
| 2,756,406 | 7/1956 | Schurman | 340/17 |
| 3,562,638 | 2/1971 | Renord | 324/43 |
| 3,610,973 | 10/1971 | Bauer | 340/17 |

Primary Examiner—Malcolm F. Hubler
Assistant Examiner—T. M. Blum
Attorney, Agent, or Firm—Omund R. Dahle

[57] ABSTRACT

A seismic detector or vibration detector which is of small dimensions and weight and yet is very sensitive. The pick-up of this seismic detector is a thin film magnetometer which is located in an inhomogeneous or non-uniform magnetic field within the detector case.

5 Claims, 8 Drawing Figures

RIGID METAL (11)
CONETIC (12)
COPPER (13)

INVENTOR.
VAHRAM S. KARDASHIAN
BY Osmund R. Dahl
ATTORNEY.

INVENTOR.
VAHRAM S. KARDASHIAN

BY Osmund R. Dahle
ATTORNEY

DISPLACEMENT DETECTOR USING MAGNETOMETER SENSOR

BACKGROUND AND SUMMARY OF THE INVENTION

Seismometers are used to measure ground vibrations. The vibrations are quasi-sinusoidal both in amplitude and frequency. The periods of the seismic vibrations vary from milliseconds for artificial explosion to order of several hours for measurement of tidal effects. Ground displacements vary from $10^{-7}$ centimeter, detectable by observatory instrumentation, to several centimeters. In the seismometer of the present invention there is interest in measuring ground displacements with frequencies ranging from less than about 0.1 Hz up through high frequency oscillations. Both horizontal and vertical displacements are to be measured. The basic principle involved is that of a heavy suspended mass which remains relatively motionless because of its inertia, when the supporting case structure undergoes translational motion. The sensing of this translational displacement is measured by highly sensitive magnetometers.

A sensitive magnetometer can be made to measure a change in the ambient magnetic field of an enclosed and a magnetically shielded chamber. The field in the chamber is that of a set of magnets, or, for instance, a quadrupole field structure. An inhomogeneous magnetic field is produced in which, at the center of the chamber where the magnetic sensor is located, the field is near or at zero. From this null position to the edge of the quadrupole structure, the magnetic field increase may be made to values in the order $10^7$ gammas. This displacement of the massive pendular quadrupole structure and its field relative to the sensor, subjects the sensor to a field gradient. This field gradient may be in the order of $10^6$ gammas/centimeter. Since the point sensor can measure this field to an accuracy of better than 1 gamma, the resolution in the measurement of the displacement of the magnetic sensor relative to the magnetic field approaches in the limit $10^{-6}$ centimeters for a magnetometer detectivity level of 1 gamma. Since the device measures relative displacement it can be used either as a seismometer or an accelerometer.

This sensor must be shielded from the environmental or earth's field which is external to the seismometer device and therefore the enclosure requires sufficient high permeability material to shield the chamber especially from the changes in this external field. The external field is in the order of 50,000 gammas, and the changes usually less than 1,000 gammas.

BRIEF DESCRIPTION OF THE DRAWINGS

FIGS. 3 and 4 are modifications of FIGS. 2 and 3 to show the invention sensitive in the Z axis as well as in the XY axis;

DESCRIPTION

Figure 1:
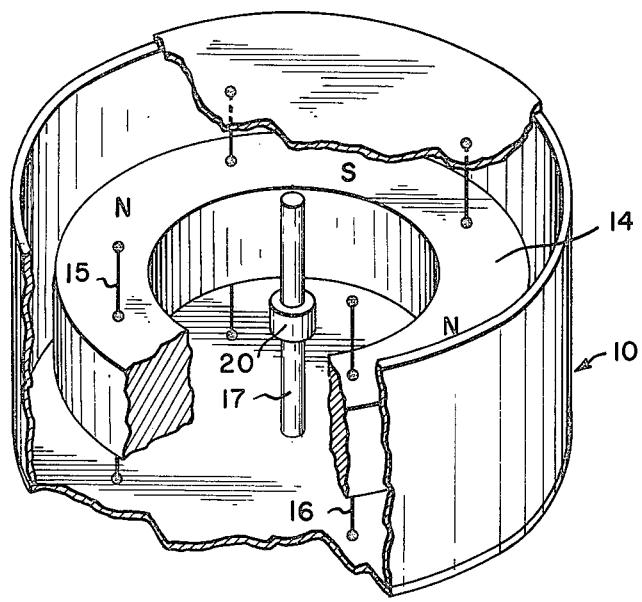
FIG. 1 is a perspective view of a preferred embodiment of the invention showing the case partly cut away, the quadrupole magnet and its suspension and the sensors of the seismometer.
Figure 2:
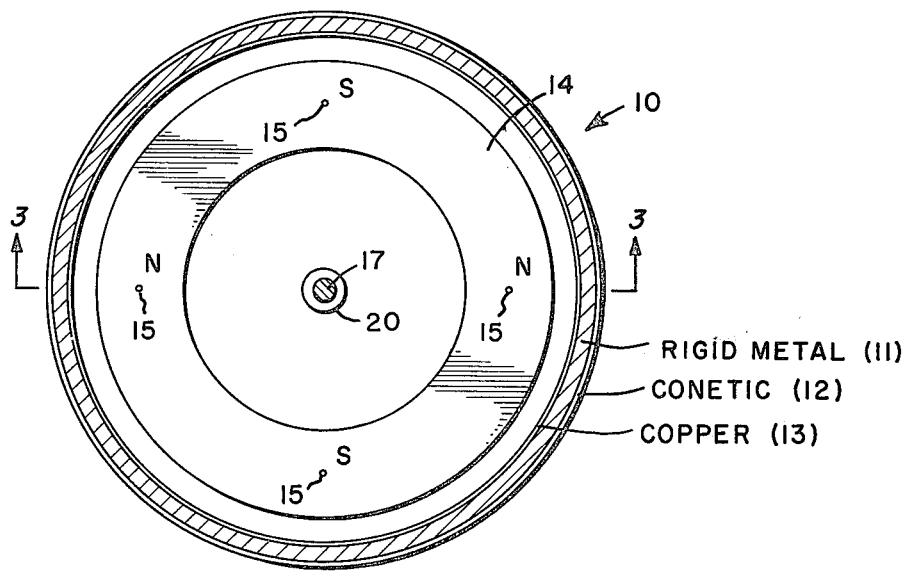
FIG. 2 is a top plan view of the device of FIG. 1 as seen from inside the case cover.
Figure 3:
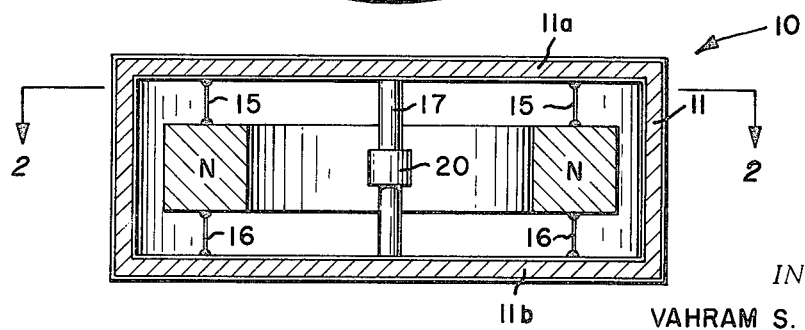
FIG. 3 is a cross-section edge view of the device as shown in FIGS. 1 and 2.
Figure 7:
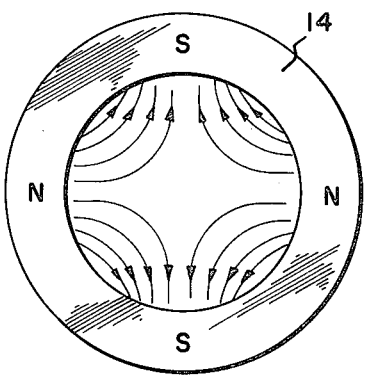
FIG. 7 is a schematic representation of the magnetic field configuration.

Referring to the perspective partially cutaway view of FIG. 1, and to FIGS. 2 and 3 there is disclosed the seismic or vibration detector which has a rigid metal case 10 including wall member 11, top 11a, and base 11b which completely encloses the device. The seismic detector case is to be placed in contact with the earth so that it moves with the earth's vibrations. The case may have an exterior layer or layers 12 of a high permeability material such as "Conetic" or "Permalloy" to shield the chamber from the external magnetic field. This external field, or earth's field, is in the order of 50,000 gammas. It is desired to isolate the magnetic sensor within the enclosure from the effect of the environmental field external to the seismometer device. The inner surface of the casing can be a third layer or coating of highly conductive metal 13, such as copper, for the purpose of introducing damping to any oscillations of the magnet 14 suspended within the device. This magnet 14 may be a set of magnetic poles arranged to produce, for example, a quadrupole field structure. The field required to be generated for this arrangement is an inhomogeneous or non-uniform magnetic field of the type shown in FIG. 7 and the quadrupole is one instance of an inhomogeneous field producing magnet structure. At the center of the quadrupole magnet, that is, the center of the chamber, the field is at or near zero. The magnetic structure 14 is suspended by elastic supports such as a plurality of metallic bands or wires 15 which are attached to the top of the casing 10. Similar metallic bands 16 are below the magnetic mass supporting to the base of the case so that the metallic bands 15 and 16 operate as a taut wire suspension allowing relative horizontal motion of the magnet 14 with respect to the case in the X and Y axes.

A central cylindrical member 17 rigidly supports a light weight magnetic sensor 20 at the center of the detector. The magnetic quadrupole 14 surrounds the sensor in such a position that when the apparatus is at rest, the magnetic null position is at the sensor location. Displacements of the case 10, and therefore of the sensor 20 which is rigidly attached to it by member 17, with respect to the magnet structure 14 will be sensed by the magnetometer 20. The sensor 20 may actually comprise a first magnetometer and a second magnetometer placed perpendicular to the first to sense motions orthogonal to the first sensor thereby allowing sensing of motions in the X and Y axes.

Figure 4:
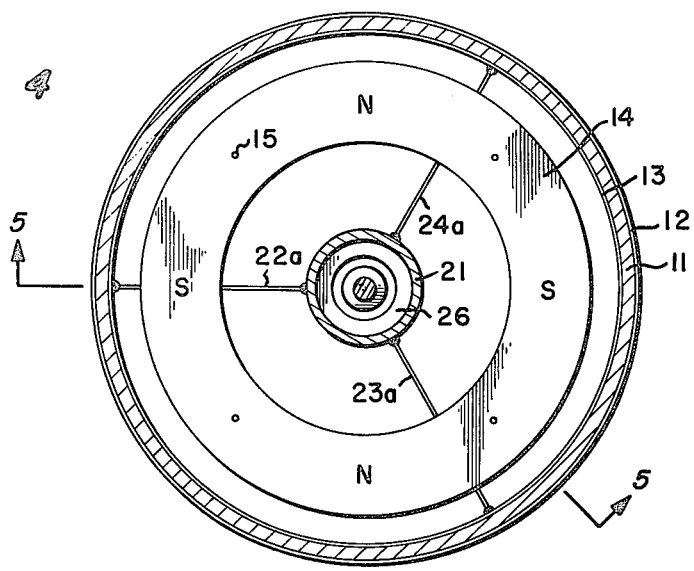
Figure 5:
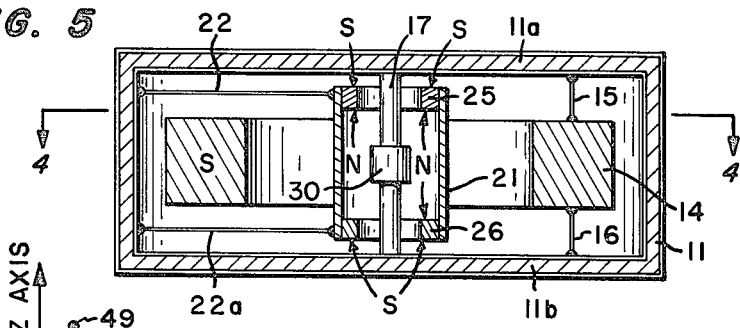

FIGS. 4 and 5 show a modification of the embodiment of FIGS. 1, 2 and 3 by the addition of another component to include sensing in the Z axis as well as in the XY axis.

FIGS. 4 and 5 disclose a cylindrical member 21 surrounding the central member 17, and suspended by taut wires 22, 22a, 23, 23a, 24 and 24a from the wall 11. The cylindrical member 21 has a ring type magnet at the top and the bottom thereof. The upper magnet 25 is positioned to have its north pole at its lower face and the lower magnet 26 is positioned to have its north pole at its upper face. It may be seen that the magnets 25 and 26 are symmetrically positioned above and below sensor 30 so that an inhomogeneous magnetic field exists at the sensor due to these magnets. When the earth's vibrations have a vertical component or Z axis component, the case 10 together with sensor 30 receives a signal indicating vertical displacement. The suspended magnet structure 21, 25, 26 tends to remain stationary and therefore there is relative displacement between the magnets 25 and 26 and the sensor 30.

Figure 6:
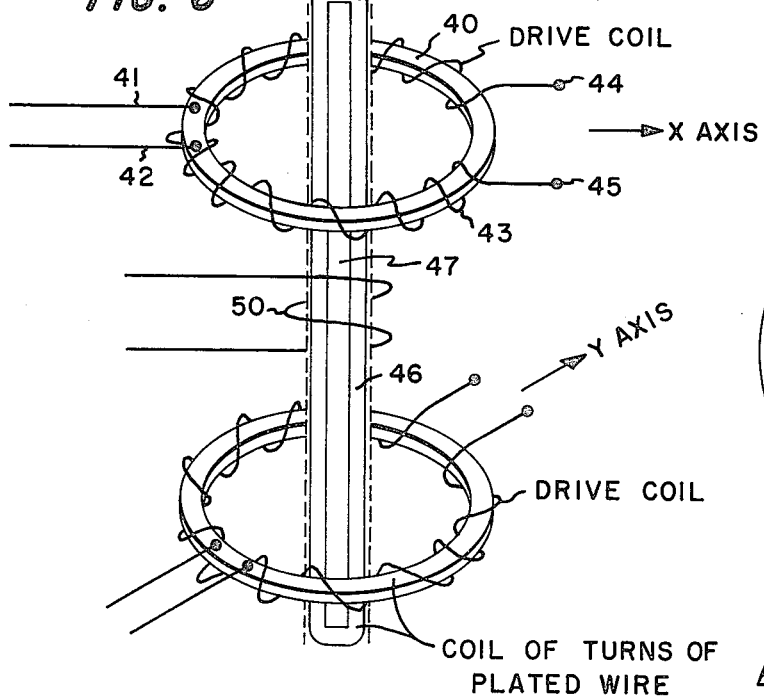
FIG. 6 is a schematic representation of the three sensors of FIGS. 4 and 5.

FIG. 6 shows a magnetometer sensor structure which is sensitive in the X,Y and Z axes for use in the apparatus of FIGS. 4 and 5. One type of magnetometer suitable for the purpose is disclosed in the co-pending application Ser. No. 45,466 entitled "Anisotropic Thin Film Plated Wire Magnetometer Utilizing A Coil of Plated Wire Having A Plurality of Turns" and filed June 11, 1970, now U.S. Pat. No. 3,657,641 and which is assigned to the same assignee as the present invention. A magnetometer therein described in detail discloses a plated wire wound a number of turns around a cylindrical or rectangular core, the plated wire acting as both sensor material and pick-up coil. A high frequency energized driver coil is wound over the plated wire sensor coil. In FIG. 6 each of the 3 sensors is orthogonal to the others and each senses independently of the others to provide 3 outputs which are functions respectively of the magnetic field strength at each sensor which in turn is a function of the earth's vibration in that axis.

Thus the X axis sensor has a cylindrical form around which is wound a plurality of turns of the plated wire 40 terminating at terminals 41 and 42. These turns 40 form the inner coil. The sensor also includes a toroidally wound outer drive coil 43 which is wound around the inner coil, the outer coil having terminals 44 and 45. The Y and Z axes sensors may be of the same type and be oriented orthogonal to the other. The Z axis sensor may also be the type disclosed in FIG. 6 in which the plated wire sense coil 46 is wound around a thin rectangular form 47; the coil terminals being brought out at 48, 49. The drive coil 50 provides the same function as coil 43 of the other sensor. Although a plated wire magnetometer has been disclosed for explanatory purposes it is clear that any other sensitive magnetometer may be utilized as the sensor.

The specific embodiment has been shown with the magnet structure suspended for relative movement. It is equally operable to reverse the mounting of magnets and magnetometer sensor to rigidly affix the magnetic structure within the case and non-rigidly suspend the magnetometer sensor having provided sufficient mass thereto to have the proper inertia with respect to the case and magnet structure.

Figure 8:
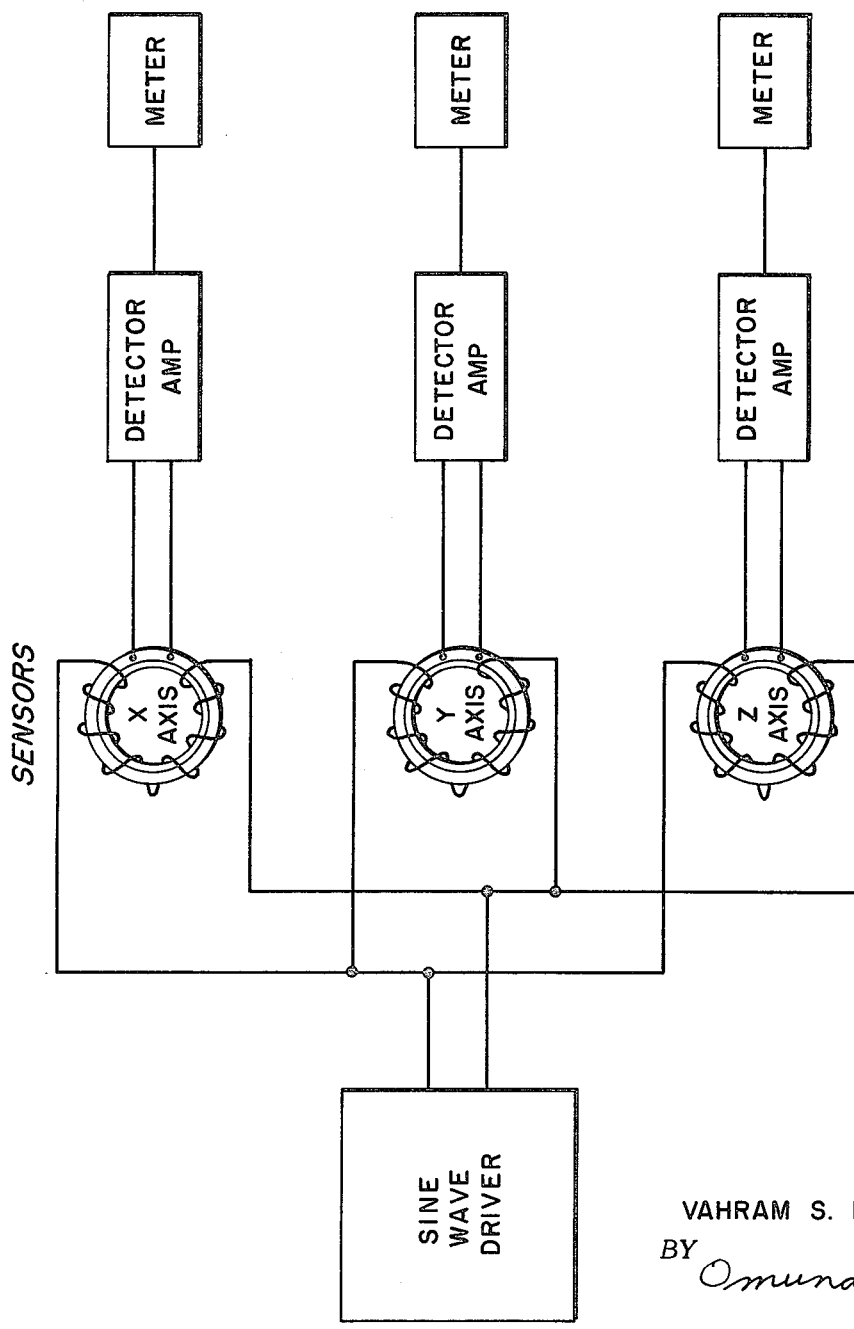
FIG. 8 is a schematic representation of the electrical system.

FIG. 8 discloses a block diagram of an electrical system receiving the signals from the sensors to provide an indication. An alternating current generator such as sine, square or triangular wave generator, which may operate in the area of a megahertz, for example, is connected to energize the drive coil of each of the X, Y and Z sensors. The oscillations appear on the output terminals of the sense coils as carrier frequency output voltages. Signal modulations are impressed on the carrier output voltages representing the response of the sensors to a varying magnetic field resulting from seismic vibration of the earth or acceleration and therefore of the apparatus.

The embodiments of the invention in which an exclusive property or right is claimed are as follows:

1. A displacement detector utilizing a magnetometer operating in an inhomogeneous magnetic field created within the detector for providing an electrical output from the magnetometer which is a measure of displacement at the detector, comprising:

magnetic field generating means for generating an inhomogeneous magnetic field;

magnetic field shielding enclosure means comprising high permeability material for excluding the external magnetic field surrounding said magnetic field generating means;

magnetometer sensor means in said enclosure, said magnetometer sensor means including a driver coil energized by a high frequency current;

means rigidly positioning one of said magnetometer means and magnetic field generating means with respect to said enclosure;

suspension means fastened to said enclosure and non-rigidly suspending the other of said magnetometer means and magnetic field generating means within said enclosure such that there can be relative movement between said magnetometer means and said magnetic field generating means whereby displacement causing motion of said enclosure causes relative motion of magnetometer sensor means with respect to said magnetic field generating means and results in an electrical output from said magnetometer indicative of said displacement.

2. The invention according to claim 1 in which said magnetometer sensor means are rigidly positioned with respect to said enclosure and said magnetic field generating means have said non-rigid suspension means.

3. The invention according to claim 1 in which said magnetic field generating means is a ring shaped quadrupole magnetic structure.

4. The invention according to claim 2 and further comprising a coating of copper on said enclosure means for damping movement of said magnetic field generating means.

5. The invention according to claim 1 wherein said suspension means comprises a plurality of taut wires.

* * * * *